United States Patent [19]

Mesiwala

[11] Patent Number: 6,097,776
[45] Date of Patent: Aug. 1, 2000

[54] MAXIMUM LIKELIHOOD ESTIMATION OF SYMBOL OFFSET

[75] Inventor: Hakim M. Mesiwala, Cupertino, Calif.

[73] Assignee: Cirrus Logic, Inc., Fremont, Calif.

[21] Appl. No.: 09/022,530

[22] Filed: Feb. 12, 1998

[51] Int. Cl.[7] .................................................... H04L 7/00
[52] U.S. Cl. .......................... 375/355; 375/366; 370/513
[58] Field of Search .................................. 375/259, 260, 375/285, 354, 355, 362, 365, 368, 371, 366; 370/350, 503, 509, 513, 514, 522, 526

[56] References Cited

U.S. PATENT DOCUMENTS

| Re. 32,172 | 6/1986 | Johnston et al. | 381/46 |
|---|---|---|---|
| 3,377,428 | 4/1968 | Dersch | 179/1 |

(List continued on next page.)

OTHER PUBLICATIONS

Kang, K. et al., "Statistical Properties of Out–of–Frame Detection Schemes for Digital Transmission Systems", IEEE Transactions on Communications, vol. 40, No. 5, pp. 980–987, May 1992.

Christodoulides, L.M. et al., "Frame Synchronization Using Two Frame Alignment Words", Electronics Letters, vol. 30, No. 2, pp. 104–106, Jan. 1994.

Bajie D. et al., "Information Theory Approach to Frame Synchronisation Problem", Electronics Letters, vol. 30, No. 20, pp. 1667–1668, Sep. 1994.

Kang, K. et al, "Decision–direction Maximum–likelihood Estimation of OFDM Frame Synchronisation Offset", Electronics Letters, vol. 30, No. 25, pp. 2153–2154, Dec. 1994.

Saarela, K., "ADSL", Tampere University of Technology, Telecommunication Laboratory, Tampere, Finland, pp. 1–20, Feb. 1995.

Langberg, E. et al, "ADSL", Paradyne Corporation, T131.4 /96–170R1, Dallas, Texas, pp. 1–54, Nov., 1996.

Knight, S., "ADSL on Fast Track to Revolutionize Work World", Electronic News, vol. 43, No. 2166, pp. 43 & 46, May 1997.

(List continued on next page.)

*Primary Examiner*—Chi H. Pham
*Assistant Examiner*—Jean B Corrielus
*Attorney, Agent, or Firm*—Robert Platt Bell

[57] ABSTRACT

The present invention describes a method of estimating the symbol time offset in a received signal of a data modem using only one received synchronization symbol. This estimate of the offset is used for a rapid synchronization during the starting phase or for resynchronization during a microinterruption. The method estimates the offset by comparing the frequency domain constellation obtained by transforming the received synchronization symbol using the current sample pointer setting with the frequency domain constellations stored as templates. (A constellation point for a channel is phase and magnitude values in frequency domain for the channel). It chooses the template which is closest to the received constellation and declares the offset corresponding to the chosen template as the estimated offset for the received symbol. The templates are obtained by the following process. First, a time domain signal is obtained by transforming a fixed (transmitted) synchronization symbol comprising of several channels each with a constellation point specified for the channel. Next, the time domain signal is shifted by k samples and transformed into a frequency domain constellation. The frequency domain constellation serves as the template for offset value k. The shifting of the time domain signal by other values of k and obtaining the corresponding frequency domain constellations result in the set of required templates.

50 Claims, 10 Drawing Sheets

U.S. PATENT DOCUMENTS

| | | | |
|---|---|---|---|
| 3,946,157 | 3/1976 | Dreyfus | 179/1 SA |
| 4,063,031 | 12/1977 | Grunza | 179/1 P |
| 4,158,750 | 6/1979 | Sakoe et al. | 179/1 SD |
| 4,223,180 | 9/1980 | Eckels | 179/1 SC |
| 4,627,091 | 12/1986 | Fedele | 381/46 |
| 4,696,041 | 9/1987 | Sakata | 381/46 |
| 4,821,325 | 4/1989 | Martin et al. | 381/46 |
| 4,980,918 | 12/1990 | Bahl et al. | 381/43 |
| 4,982,427 | 1/1991 | Nicolai | 379/406 |
| 5,027,118 | 6/1991 | Nicolai | 341/132 |
| 5,166,924 | 11/1992 | Moose | 370/32.1 |
| 5,295,225 | 3/1994 | Kane et al. | 395/2.35 |
| 5,323,459 | 6/1994 | Hirano | 379/391 |
| 5,459,814 | 10/1995 | Gupta et al. | 395/2.42 |
| 5,461,640 | 10/1995 | Gatherer | 375/231 |
| 5,499,254 | 3/1996 | Ikekawa et al. | 371/43 |
| 5,519,731 | 5/1996 | Cioffi | 375/260 |
| 5,559,881 | 9/1996 | Sih | 379/410 |
| 5,577,161 | 11/1996 | Ferrigno | 395/2.35 |
| 5,596,604 | 1/1997 | Cioffi et al. | 345/260 |
| 5,625,651 | 4/1997 | Cioffi | 375/354 |
| 5,673,290 | 9/1997 | Cioffi | 375/260 |
| 5,914,981 | 6/1999 | Veintimilla | 375/200 |
| 5,943,375 | 9/1999 | Veintimilla | 375/355 |

OTHER PUBLICATIONS

Baines, R., "ADSL Community Faces Line Code Challenge", Electronic News, vol. 43, No. 2166, p. 48, May 1997.

Losowick, P., "VDSL Gains as Technology Barriers Fall", Electronic News, vol. 43, No. 2166, p. 52, May 1997.

Hering, U., "Market to Support Several Implementations of xDSL", Electronic News, vol. 43, No. 2166, p. 56, May 1997.

"Network and Customer Installation Interfaces—Asymmetric Digital Subscriber Line (ADSL) Metallic Interface", American National Standard for Telecommunications, ANSI T1.413–1995, 170 pages, Aug. 1995.

MAXIMUM LIKELIHOOD ESTIMATION OF SYMBOL OFFSET

FIELD OF THE INVENTION

The present invention relates to a technique and apparatus for synchronizing modems, particularly Digital Subscriber Line type modems.

BACKGROUND OF THE INVENTION

Prior Art telephone modems in general use, such as those constructed according to the V.34 or 56 K standard, typically use a symmetrical single-channel communications approach. Early telephone modems were designed for primitive computer systems (and other telecommunications applications) where it was presumed that the data flow between two computers (or computer and terminal) would largely be equal in both directions.

However, with the advent of Internet communications, the balance of data flow between a remote computer and a computer system has become severely lop-sided. In particular, in most internet communications, a remote user sends only a small amount of data "upstream" toward the computer system (e.g., ISP or the like) indicating his or her command and selection choices. In contrast, the amount of data downloaded (e.g., Web site graphical data, images, video, and the like) may be huge. Prior art modems design is based in the incorrect assumption that data flow will be approximately equal in both directions. Such a scenario does not make best use of available bandwidth in a telephone signal.

In addition, the single-channel approach of prior art modems does not begin to use all available bandwidth in a telephone line. Prior art modems were designed to operate over standard telephone lines for any given distance (including overseas and satellite calls) and thus were designed to perform well for the minimum amount of bandwidth in a telephone system. Most prior art modems (including V.34) are designed to operate within a narrow 34 KHz POTS (Plain Old Telephone Service) bandwidth.

Again, with the advent of Internet communications, modem usage has changed. Remote users are less likely to dial cross-country or across the world to connect with a computer system. Rather, a user will call a local Internet Service Provider (ISP) through a local telephone company central office (CO) and access remote computers via the Internet. The distance between a typical user and the nearest CO may be on the order of one to two miles, and thus the available bandwidth far in excess of the traditional 3.4 KHz POTS.

A new modem standard known as Asymmetric Digital Subscriber Line (ADSL) has been proposed and is already in limited use for applications such a Video-on-Demand and the like. ADSL Modems are described, for example, in American National Standards Institute standard ANSI T1.413-1995 entitled "Network and Customer Installation Interfaces—Asymmetric Digital Subscriber Line (ADSL) metallic interface", incorporated herein by reference.

In ADSL, the upstream and downstream data paths may not be symmetrical. The upstream data rate may be as high as 640 Kilo-bits per second (Kps) whereas the downstream data rate may be as high as 6 Mega-bits per second (Mps). ADSL also takes advantage of the increased bandwidth available in local phone service (as well as improved long distance bandwidth provided by fiber optics and the like) by using a plurality of discrete data channels to transmit data in both directions.

A description of ADSL architecture may also be found, for example, in ADSL, by Kimmo K. Saarela (Tampere University of Technology), incorporated herein by reference. In order to understand the present invention, a basic understanding of ADSL architecture and timing and synchronization controls is in order.

Figure 1:
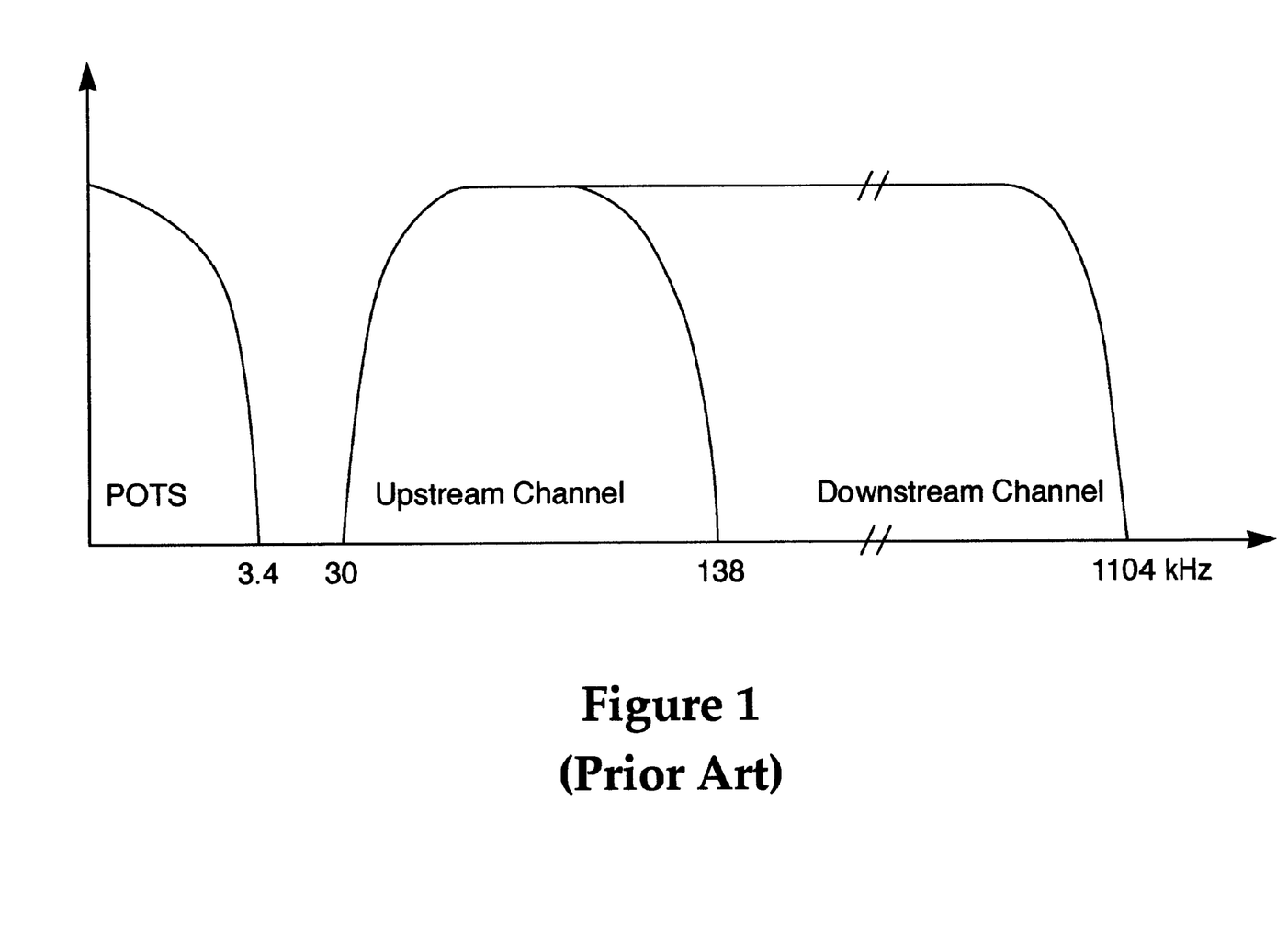
FIG. 1 is a frequency diagram illustrating the general bandwidth allocation for the ADSL modem specification.

FIG. 1 is a frequency diagram illustrating the general bandwidth allocation for the ADSL modem specification. The lower 3.4 KHz is the traditional telephone bandwidth, otherwise known as "plain old telephone services" or POTS. Above that bandwidth, between approximately 30 and 138 KHz is allocated for the upstream channel. Note that the numbers illustrated in FIG. 1 are by way of example only.

The remainder of the bandwidth, up to 1104 KHz may be used for the downstream channel. Again, the numbers illustrated in FIG. 1 may be approximate.

Figure 5:
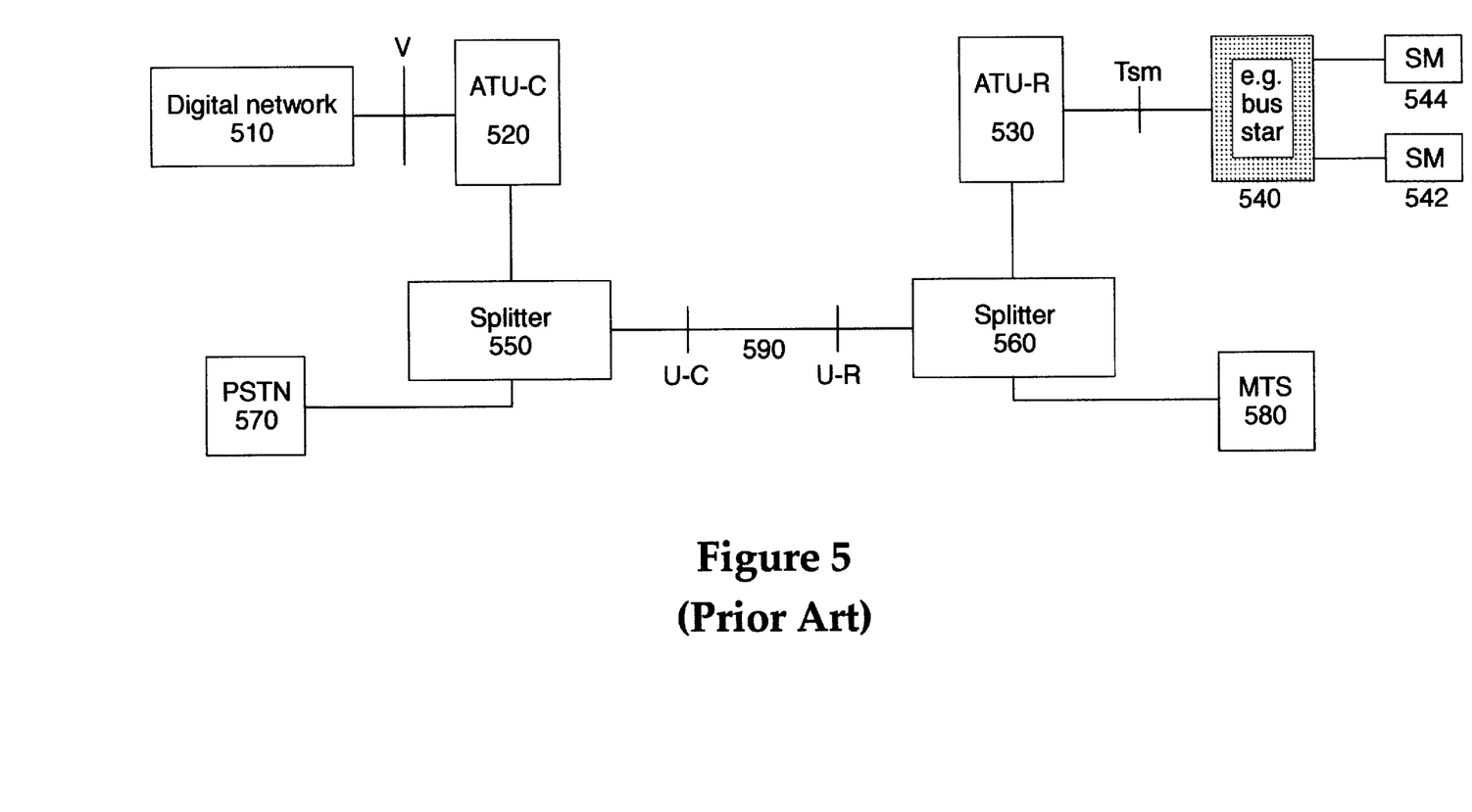
FIG. 5 is a block diagram illustrating an overview of an ADSL modem system.

FIG. 5 is a block diagram illustrating an overview of an ADSL modem system. A digital network (e.g., Internet, Internet Service Provider, on-line database, video-on-demand, or the like) may interface with central office ADSL transceiver unit ATU-C 520 through logical interface V. The output of ATU-C 520 may be mixed in splitter 550 with the output of public switched telephone network (PSTN) 570 and transmitted over loop interface 590 (e.g., copper twisted pair).

Splitter 560 may receive the combined signal and output the plain old telephone signal (POTS) otherwise known as message telecommunications service (MTS) 580. Digital data is output from splitter 560 to ADSL transceiver unit 530 which is interfaced through interface Tsm to customer installation 540 (e.g., bus star or the like) to service modules SM 544 and 542 (e.g., computer or the like). Data may also be transmitted upstream, from ATU-R 530 to ATU-C 520, as discussed above.

Figure 2:
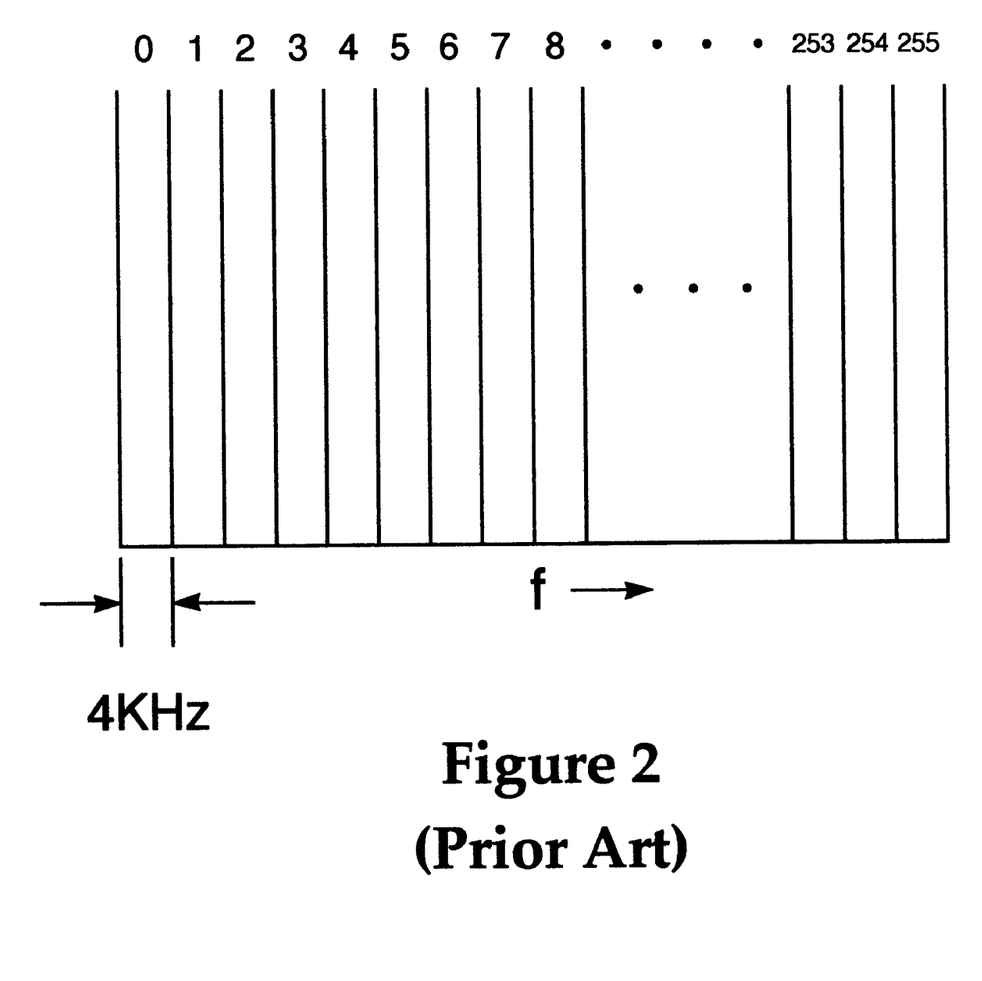
FIG. 2 is a frequency domain diagram illustrating how either of the upstream or downstream channels may be sub-divided into a number of discrete 4 KHz data channels 4 KHz wide.

FIG. 2 is a frequency domain diagram illustrating how either of the upstream or downstream channels may be sub-divided into a number of discrete data channels each occupying 4 KHz bandwidth. For the sake of brevity, all of the 4 KHz channels are not illustrated in FIG. 2, which uses, by way of example, the downstream channel comprising 256 channels of 4 KHz each. Upstream communication comprises a total of 32 channels of 4 KHz each. Each channel may simultaneously transmit (with other channels) a number of bits, depending upon the type of modulation used (e.g, quadrature amplitude modulation or the like).

Each channel may transmit a fixed number of bits, from 0 to 15 every symbol time. However, the average number of bits per channel is approximately six bits. For the downstream path, six bits per channel, with 256 channels at 4 KHz results in a data rate of approximately six Megabits per second, a considerable improvement over the 56 K modems typically in use.

One of the channels illustrated in FIG. 2 (e.g., Carrier #64, f=276 kHz) may generate a pilot tone signal for synchronizing clocks between a downstream transmitter and corresponding receiver. For the sake of brevity, further discussion will be with regard to the downstream path, however it should be understood that the following information will also apply to the upstream path as well.

The synchronizing clock signal may be used in synchronizing the clocks of downstream transmitter and receiver upon initial connection, as well as after any micro-interruption or other disturbance where signal may be momentarily lost. In order to communicate data, the system must be able to synchronize properly after such a disturbance, and the ADSL modem specification specifies a frame symbol for this purpose.

Figure 3:
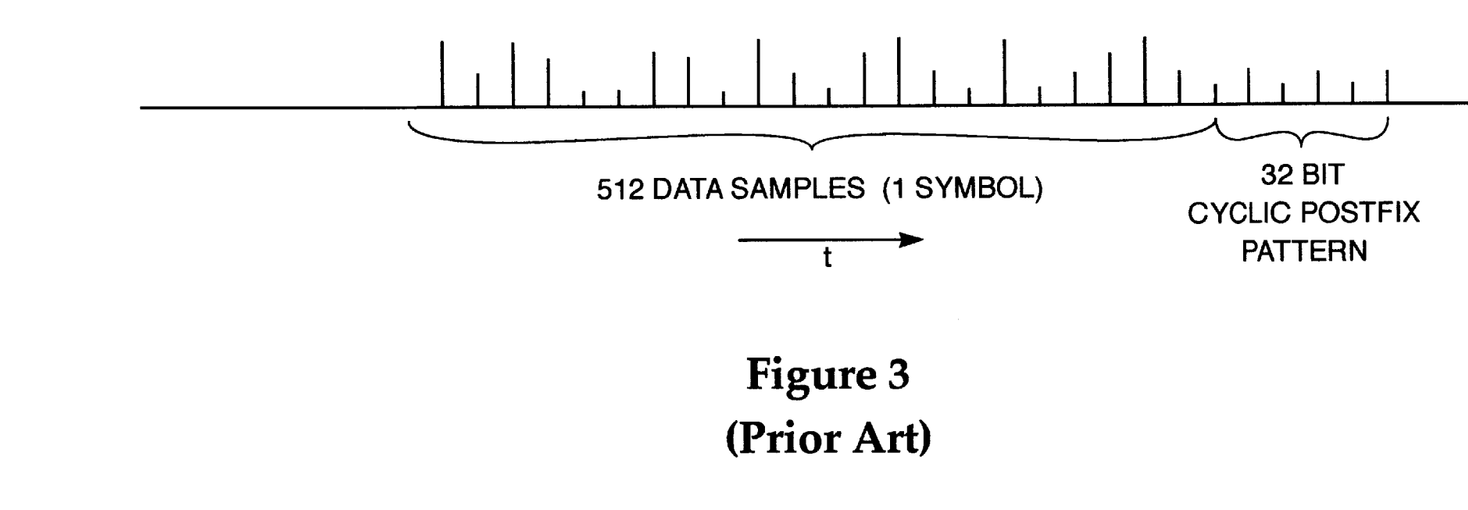
FIG. 3 is a simple diagram illustrating a symbol comprising a group of 512 samples plus cyclic prefix bits.

As noted above, FIG. 2 illustrates the frequency domain. When converted to the time domain using an inverse Fast Fourier Transform (FFT), the 256 channels at one point in time generate 512 time domain samples. For practical purposes, 32 samples are added to the 512 samples to form cyclic prefix patterns. FIG. 3 is a simple diagram illustrating a group of 512 samples plus cyclic prefix patterns. Such a group may be referred to as a symbol.

Figure 4:
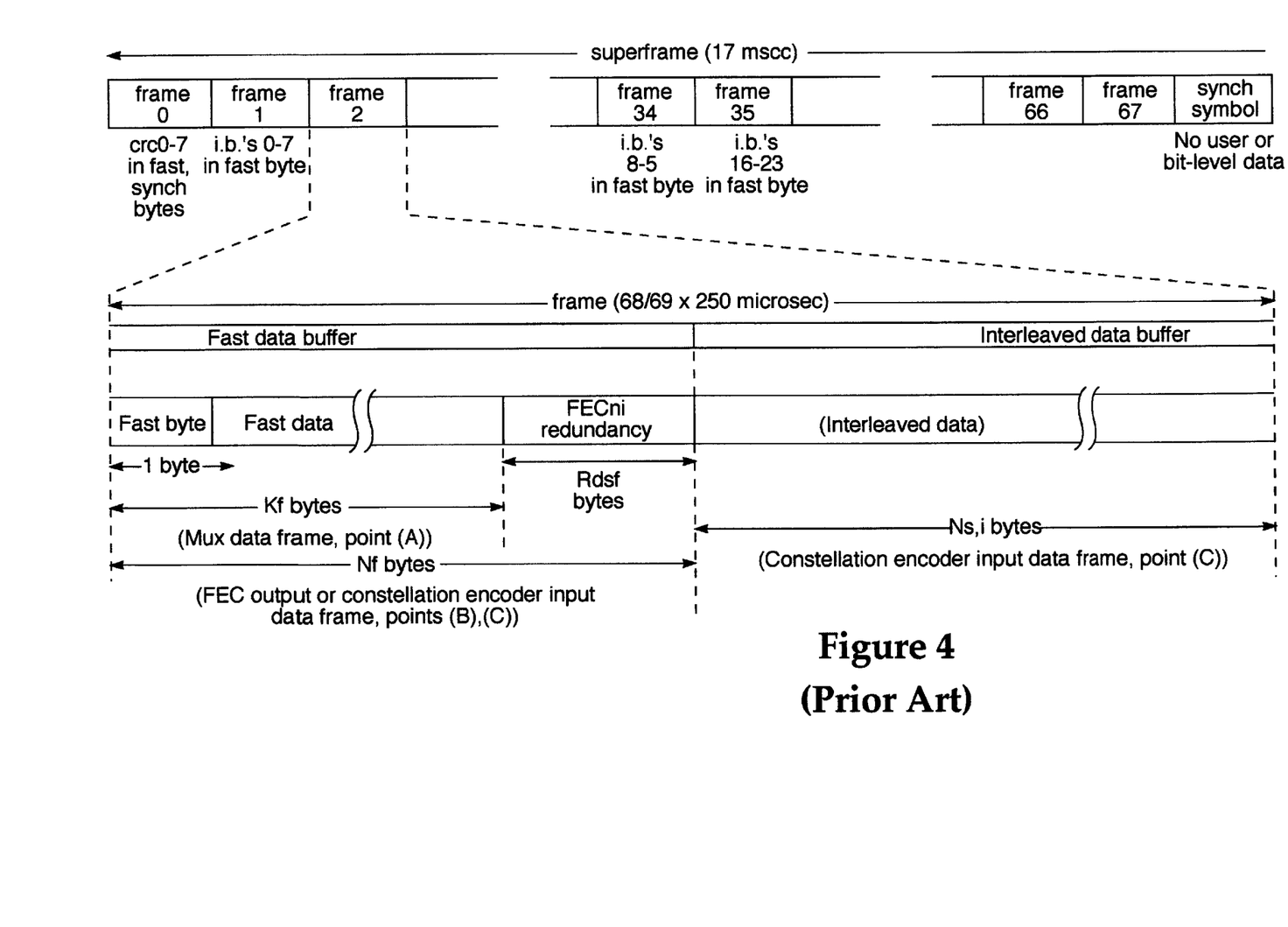
FIG. 4 illustrates the construction of a superframe of data according to the ADSL specification.

The diagram of FIG. 4 is schematic only, to further illustrate the arrangement of data symbols. A group of 68 symbols may be concatenated (e.g., placed end-to-end) to form a superframe of data. With each superframe of data, one symbol is included as the synchronization symbol.

FIG. 4 illustrates the construction of such a superframe. FIG. 4 illustrates how the synchronization symbol (or frame) is transmitted every 69th symbol. Unlike the clock synchronization channel discussed above, which merely synchronizes clock signals, the synchronization symbol helps each modem to establish boundaries of groups of data, namely each symbol.

At a receive end when symbol synchronization is lost, the starting position of a subsequent synchronization symbol may be displayed from the position it would have been by some number of samples. This displacement may be referred to as symbol offset or offset.

SUMMARY OF THE INVENTION

The present invention describes a method of estimating the symbol offset in a received signal of a data modem using only one received synchronization symbol. This estimate of the offset is used for a rapid synchronization during the starting phase or for resynchronization during a microinterruption.

The method estimates the offset by comparing the miltichannel constellation obtained by transforming the received synchronization symbol using the current sample pointer setting with the miltichannel constellation stored as templates. It chooses the template which is closest to the received miltichannel constellation and declares the offset corresponding to the chosen template as the estimated offset for the received symbol.

The templates are obtained by the following process. First, a time domain signal is obtained by transforming a fixed (transmitted) synchronization specified in frequency domain and symbol comprising of several channels each with a specified constellation point for the channel. (A constellation point for a channel is magnitude and phase values in frequency domain for the channel.) Next, the time domain signal is shifted by k samples and transformed into a frequency domain pattern comprising of resulting constellation points for all channels making up the symbol. The frequency domain pattern serves as the template for offset value k. The shifting of the time domain signal by other values of k and obtaining the corresponding frequency domain pattern result in the set of required templates.

The present invention utilizes the synchronization symbol to estimate the symbol offset within one symbol period. The offset estimate helps to synchronize downstream transmitter and receivers with one another within one synchronization symbol.

Internal counters within a modem may indicate roughly where expected symbol boundaries are to occur. It therefore also indicates where the synchronization symbol will be. A symbol may be synchronized using the clock synchronization channel and internal counters but it creates an ambiguity of 0, or +/−8 samples (or some other multiple of eight samples).

A series of stored templates (stated above) of constellations of synchronization symbols for different offsets are compared with the received synchronization symbol constellation. The offset for the stored template having a minimum Euclidean distance from the received constellation corresponds to the amount of offset correction needed in framing. This offset determination is achieved with only a received synchronization symbol.

DETAILED DESCRIPTION OF THE INVENTION

Referring to FIG. 5, when ATU-C 520 starts to communicate with ATU-R 530, ATU-C 520 needs to synchronize with ATU-R 530. Also, during a connection, microinterruptions could cause the synchronization to be lost momentarily, creating a need for resynchronization.

Generally, each fresh connection between ATU-C and ATU-R introduces a fixed but unknown delay between transmission and reception of a digital signal. Thus, both the received samples and received symbols require synchronization with the transmitted samples and symbols, respectively.

Figure 6:
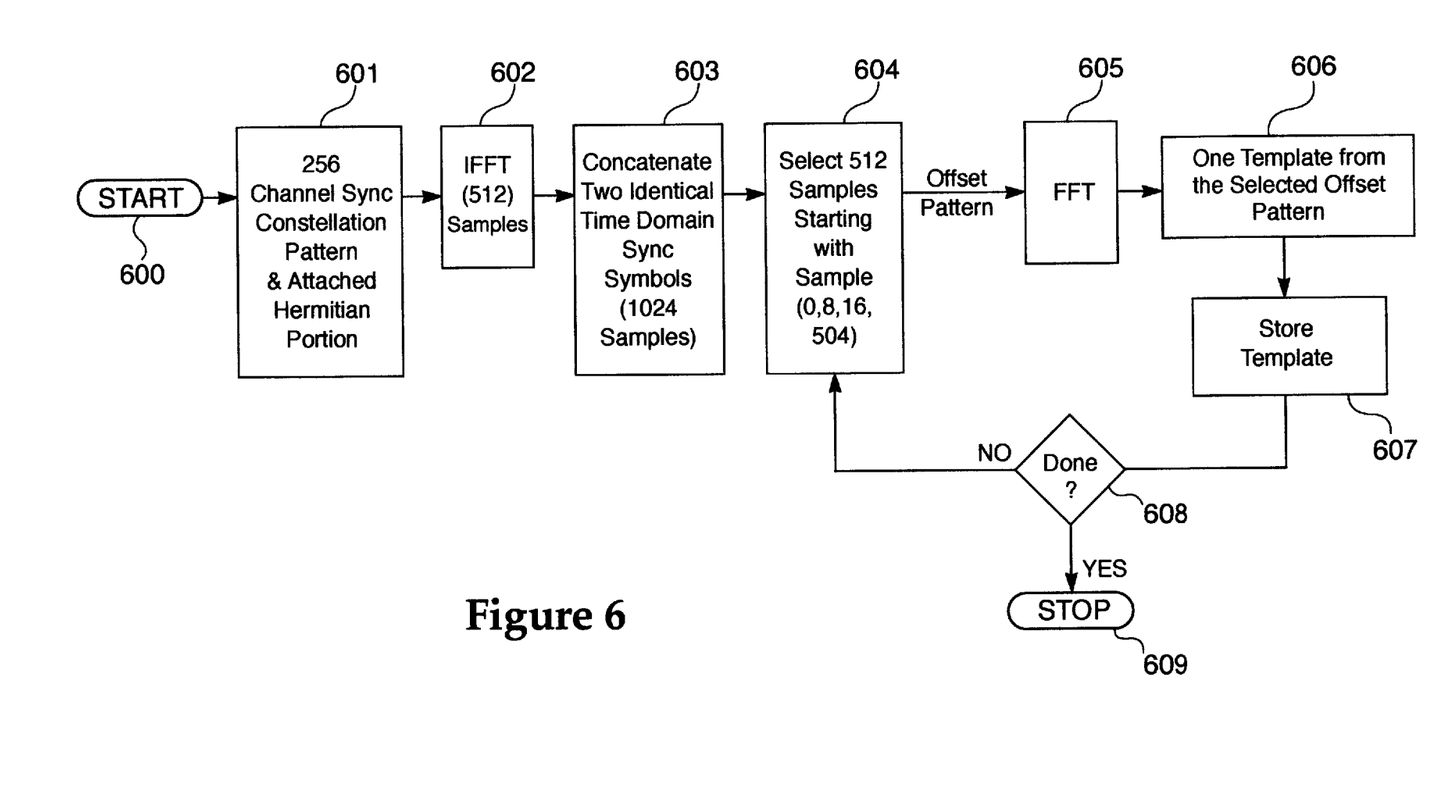
FIG. 6 is a flowchart illustrating the steps in creating a plurality of templates for use in the synchronization technique of the present invention.

FIG. 6 is a flowchart illustrating how templates may be created for later comparison in the method and apparatus of the present invention. Such templates may be created and then stored. Production devices (e.g. modems) may have such templates stored in internal memory (as discussed below) for later comparison with incoming synchronization data.

Step 601 creates 256 channel sync constellations from a given bit pattern associated with each channel and attached hermetian symmetry pattern as input. Thus, a 256 channel sync constellation pattern may comprise, for example, the standard sync pattern used in the ADSL modem specification. Other types of patterns (and corresponding number of channels, and the like) may be utilized in other applications where the synchronization technique of the present invention may be used.

In step 602, an Inverse Fast Fourier Transform (IFFT) is taken of the 256 channel sync constellation pattern (and hermetian symmetry pattern) and 512 samples are output as a time domain sync symbol. For the sake of illustration and discussion, cyclic prefix and postfix patterns are not shown.

In step 603, two identical time domain sync symbols are concatenated into a 1024 sample concatenated stream. In step 604, 512 samples from the 1024 samples are selected to produce an offset stream. Initially, the first 512 samples may be selected (e.g., 0 offset). Next, a group of samples may then be selected starting with sample 1 through 511 (e.g., 1 sample offset).

In the preferred embodiment of the present invention, the offset is taken in steps of eight samples, as the uncertainty in an ADSL system will be in multiples of eight samples due to the nature of the pilot tone synchronization unique to ADSL. However, it may be appreciated by one of ordinary skill in the art that other increments of offset may be taken, including offsets of 1, creating up to 512 different offset streams (in the example of a 512 sample system).

In the preferred embodiment, offset streams may be generated for −8, 0, 8, and 16 sample offsets. An offset of −8 samples may be generated by using a positive offset of 504 samples. One of ordinary skill in the art may appreciate that a circular shifter or the like may be used in place of concatenating and selection steps 603 and 604 to generate a stream with the desired offset.

A selected offset stream may then be transformed into the frequency domain in Fast Fourier Transform block 605 to generate a template for the selected offset stream in step 606. Such a template may then be stored in step 607. The process is repeated for all desired offsets until all templates are generated and stored as determined in step 608 at which point the process is complete in step 609.

Figure 7:
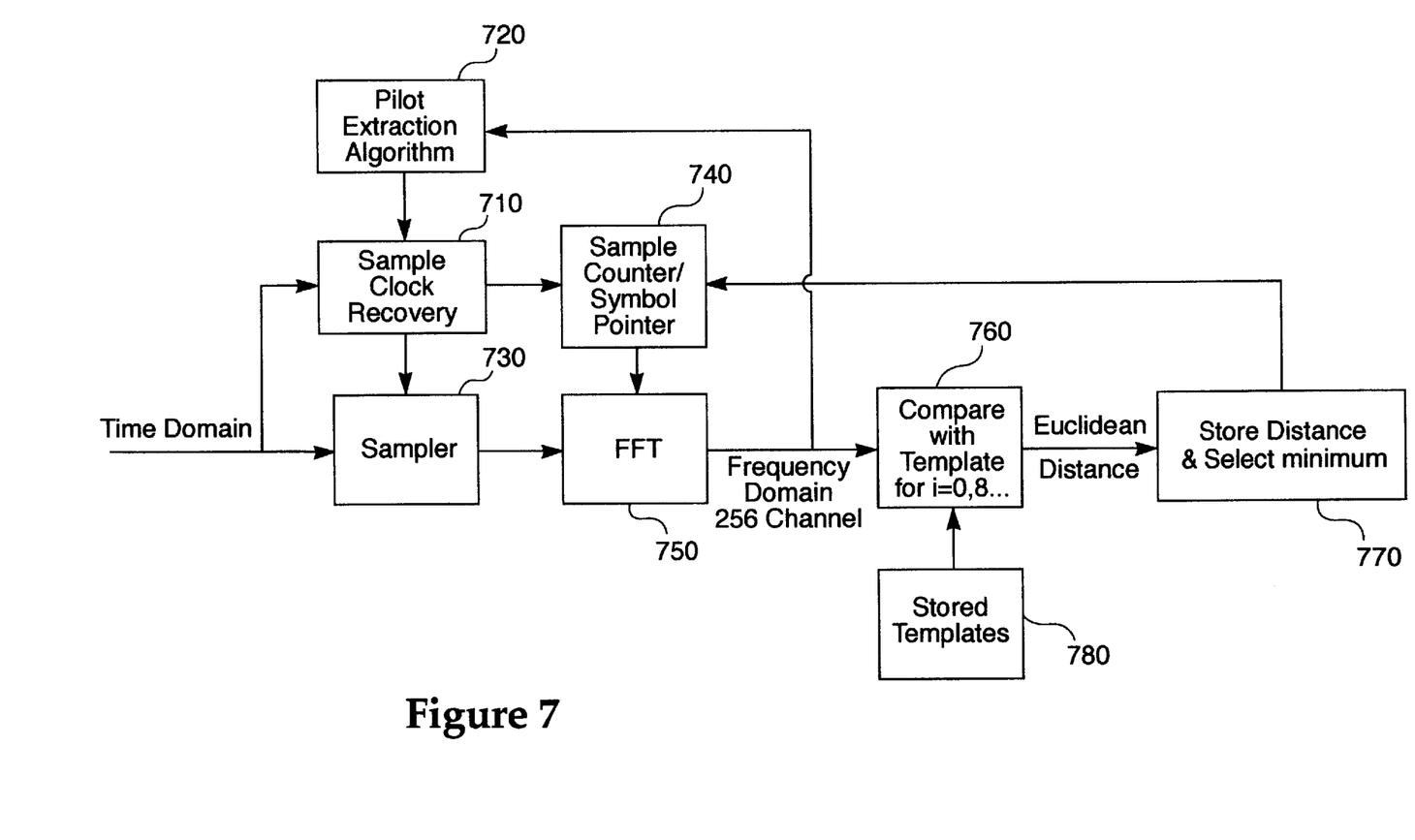
FIG. 7 is a block diagram of a portion of a receiving modem illustrating the sample offset determining technique of the present invention.

Once the templates have been created and stored, they may be used in a modem to synchronize the frame of the modem signal. FIG. 7 is an example of a block diagram of a symbol synchronization scheme. The apparatus of FIG. 7 may be incorporated into ATU-R 530 or ATU-C 520 of FIG. 5. For the sake of illustration, the apparatus of FIG. 7 is illustrated for AUT-R 530 (256 channels). However, the apparatus may be applied for ATU-C 520 (31 channels).

A time domain signal resulting from the 256 4KHz channels of FIG. 3 is input into sampler 730. This time domain signal comprise the sum of the sinusoidal type signals from each of the 256 4 KHz channels, and is a spectrally flat signal up to about 1.5 MHz. The input signal is also fed to sample clock recovery circuit 710.

Sample clock recovery circuit 710 recovers the sample clock (e.g., Carrier #64) and, using pilot synchronization algorithm 720, synchronizes sample counter and symbol pointer 740. The sample clock is fed to sampler 730 which converts the input signal into individual samples of data at the sample clock rate. The sample clock may be synchronous with the received clock. However, the symbol pointer, pointing to the boundary of each symbol (or frame) may or may not be synchronized with an actual symbol boundary.

Due to the nature of the ADSL pilot tone, although the pilot synchronization provides for synchronization of samples to the received signal, the symbol pointer may have an ambiguity of eight samples. That is to say, the symbol boundary pointer may be off by plus or minus multiples of eight samples (or may be synchronized). Thus, the synchronization of the pilot tone could lead to an ambiguity of 8*k samples in the symbol synchronization, where k is an integer.

Fast Fourier Transform (FFT) block 750 converts the time domain samples comprising a symbol into the frequency domain, generating a 256 channel constellation which may be compared in block 760 with one of the previously generated templates stored in block 780. FFT block 750 uses a sample counter setting used prior to loss of synchronization as a starting point for generating the 256 channel constellation for template compare block 760.

Stored templates may, for example, be stored at the factory when the modem is manufactured. Comparison block 760 performs an Euclidean distance calculation between the constellations of the 256 channels constellation from the frequency domain spectra of the received signal and the corresponding 256 channel constellation of a template used for comparison.

Figure 8:
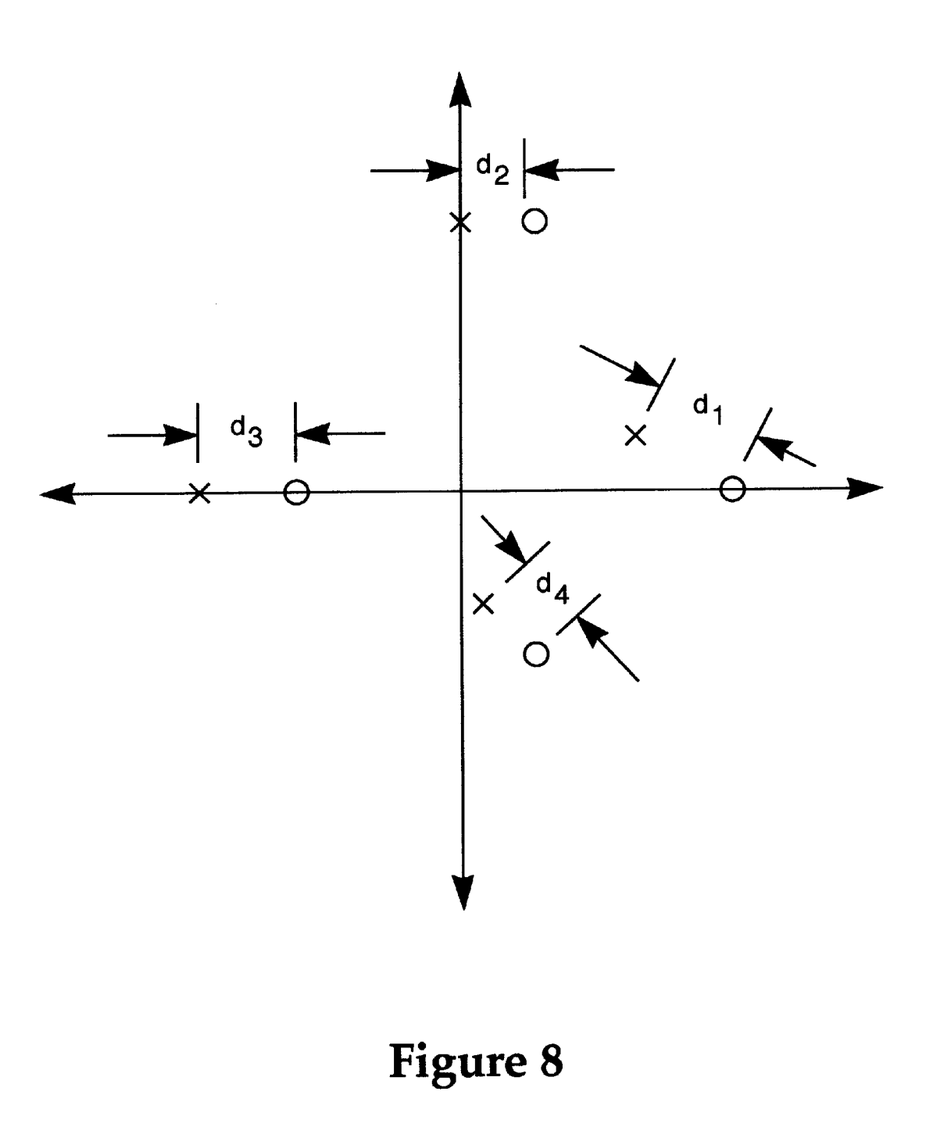
FIG. 8 is illustrates an example of Euclidean distance measurement for a simple four-point constellation, where template data may be indicated with an X, and received constellation data with an O.

As the name implies, Euclidean distance measurement measures the geometric distance between the individual constellation point of one channel of the constellation point from a corresponding channel of the selected template. FIG. 8 illustrates an example of such Euclidean distance measurement for a four-point constellation of four channels, where a template constellation point may be indicated with a X, and received constellation points with an O. Euclidean distance for four channels is calculated as:

$$d^2 = d_1^2 + d_2^2 + d_3^2 + d_4^2$$

These Euclidean distances are measured for all channels and summed together for all 256 channels to form an overall Euclidean distance measurement for a received constellation/template constellation comparison. The process is repeated for a different number of offsets (e.g., −8, 0, +8, 16, and the like). In block 770, the overall distance values for each template are stored and the minimum overall distance value is selected. The template corresponding to the minimum distance value represents the corresponding offset (as determined by the offset used to generate such a template). That offset value may then be fed to sample counter and symbol pointer 740 to adjust the symbol pointer accordingly.

FIGS. 9A–H illustrate the results of simulation of the technique of the present invention of estimated offset for a 64 point FFT for 31 channels. The simulations performed illustrate that the technique works well for all shifts in the unknown received sequence from 0 to 63. The method works accurately even for a signal to noise ratio of up to 10 db using white Gaussian noise and inaccuracies in channel gains from −50% to +50% in magnitude and −90 to +90 degrees in phase, distributed randomly among the channels. FIGS. 9A–H illustrate only an example simulation of the present invention and are in no way intended to limit the spirit and scope of the present invention. The full capability of the method of the present invention may be expanded beyond 31 channels.

Figure 9A:
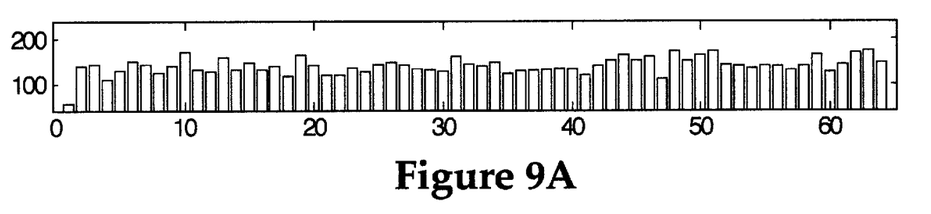
FIG. 9A illustrates results of a simulation of the technique of the present invention for a 64 point FFT for 31 channels at an offset of 1 sample.

FIG. 9A illustrates a one sample offset comparison with all 64 templates. The X axis represents template number corresponding to sample offset (here, 1 to 64) while the Y axis represents Euclidean distance measured for a given received constellation and each of the 64 templates. Note that in the preferred embodiment, only a limited number of templates may actually be used. However, to illustrate the operability of the present invention, 64 templates have been applied in the simulation.

Figure 9B:
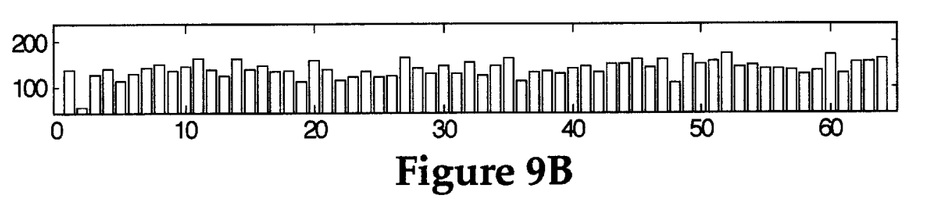
FIG. 9B illustrates results of a simulation of the technique of the present invention for a 64 point FFT for 31 channels at an offset of 2 samples.
Figure 9C:
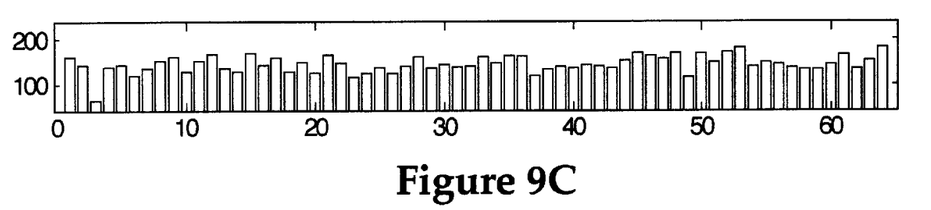
FIG. 9C illustrates results of a simulation of the technique of the present invention for a 64 point FFT for 31 channels at an offset of 3 samples.
Figure 9D:
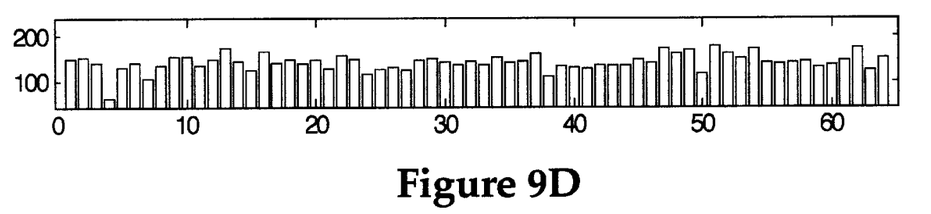
FIG. 9D illustrates results of a simulation of the technique of the present invention for a 64 point FFT for 31 channels at an offset of 4 samples.
Figure 9E:
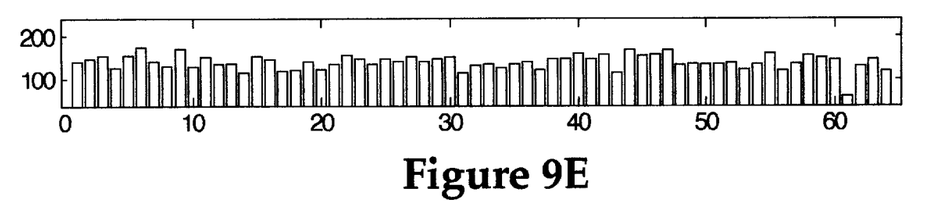
FIG. 9E illustrates results of a simulation of the technique of the present invention for a 64 point FFT for 31 channels at an offset of 61 samples (i.e., −3 offset).
Figure 9F:
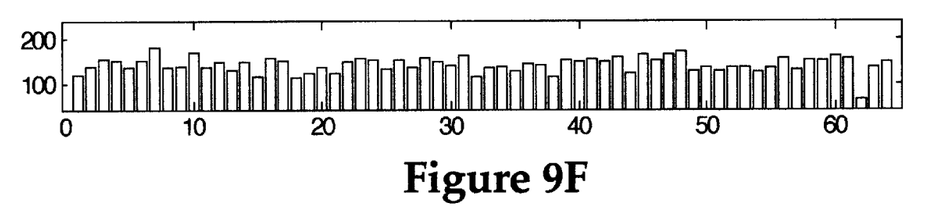
FIG. 9F illustrates results of a simulation of the technique of the present invention for a 64 point FFT for 31 channels at an offset of 62 samples (i.e., −2 offset).
Figure 9G:
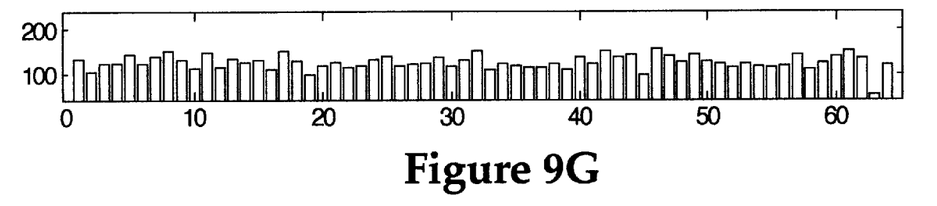
FIG. 9G illustrates results of a simulation of the technique of the present invention for a 64 point FFT for 31 channels at an offset of 63 samples (i.e., −1 offset).
Figure 9H:
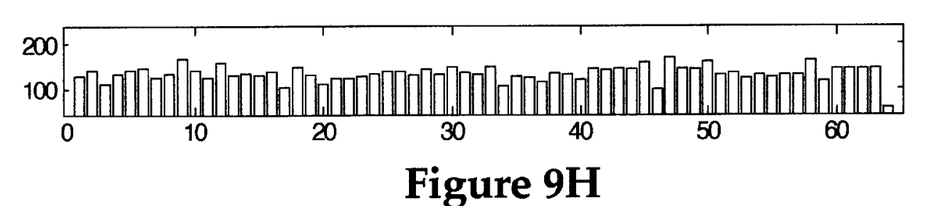
FIG. 9H illustrates results of a simulation of the technique of the present invention for a 64 point FFT for 31 channels at an offset of 64 samples (i.e., 0 offset).

In FIG. 9A, it can be clearly seen that the Euclidean distance is at a minimum for position 1, which corresponds to the offset of the received constellation. In FIG. 9B, where the offset is 2 samples, the minimum of Euclidean distance is at position 2. In FIG. 9C, where the offset is 3 samples, the minimum of Euclidean distance is at position 3, and in FIG. 9D, where the offset is 4 samples, the minimum of Euclidean distance is at position 4.

FIGS. 9E, 9F, 9G, and 9H illustrate the results for offsets of 61–64 samples, respectively, illustrating the minimum at each respective offset position. Thus, the method of the present invention accurately estimates the offset by using samples of only one synchronization symbol. Note that in this instance, an offset of 64 samples (FIG. 9H) may correspond to a zero offset in the 64 sample example shown.

In the prior art, frame synchronization may occur only after a number of synchronization symbols have been received and framing adjusted incrementally. However, in the present invention by comparing the received synchronization symbol constellation with a predetermined number of stored templates, and selecting the template with maximum likelihood as the one which is closest to the received symbol constellation in the Euclidean distance sense, it is possible to quickly and accurately synchronize or re-synchronize framing (e.g., symbol pointer) after receiving only one synchronization symbol. In this manner, the amount of data lost after a micro-interruption or the like may be minimized.

While the preferred embodiment and various alternative embodiments of the invention have been disclosed and described in detail herein, it may be apparent to those skilled in the art that various changes in form and detail may be made therein without departing from the spirit and scope thereof.

For example, in generating and comparing the constellation with the stored templates, not all channels or constellations of data need be compared in order to determine the correct offset correction. A portion or substantial portion of the constellations may be compared with similar results. Similarly, instead of using sum of squares as the Euclidean distance measure, sum of absolute differences between constellations of received symbol and each template may also be used or sum of absolute differences between corresponding coordinate points may also be used.

It may be appreciated by one of ordinary skill in the art that the synchronization technique of the present invention may be applied to other types of modem systems and other systems without departing from the spirit and scope of the present invention. For example, although described herein in conjunction with Asymmetrical Digital Subscriber Line (ADSL) modems, the method and apparatus of the present invention may also be applied to Digital Subscriber Line (DSL) and similar types of communications systems.

What is claimed is:

1. A method for estimating time offset of a synchronization symbol in a received telecommunications signal comprising the steps of:

receiving a plurality of channels of data in the time domain including components of the synchronization symbol, sampling the received plurality of channels of data at a sample clock rate to produce a synchronization symbol of unknown offset to a synchronization symbol pointer, transforming the synchronization symbol of unknown offset into the frequency domain to produce a synchronization symbol constellation, comparing the synchronization symbol constellation with a plurality of stored constellation templates, each of the plurality of stored constellation templates obtained by transforming into frequency domain a time domain version of synchronization symbol shifted by a predetermined number of samples, and determining offset of the synchronization symbol of unknown offset from the comparison of the synchronization symbol constellation with the plurality of stored constellation templates.

2. The method of claim 1, wherein the step of comparing the synchronization symbol constellation with a plurality of stored constellation templates comprises the step of measuring distances from a plurality of points in a constellation of data points within the synchronization symbol constellation to a corresponding plurality of points in a constellation of data points within the plurality of stored constellation templates.

3. The method of claim 2, wherein the step of comparing the synchronization symbol constellation with a plurality of stored constellation templates comprises the steps of successively measuring distance values between the synchronization symbol constellation with the plurality of stored constellation templates.

4. The method of claim 3, wherein the step of determining offset of the synchronization symbol of unknown offset comprises the step of selecting an offset value corresponding to a constellation template from the plurality of stored constellation templates having the least distance value as a determined offset value.

5. The method of claim 4, wherein said plurality of stored constellation templates comprises a number of constellation templates corresponding to selected offset values including offsets of high probability.

6. The method of claim 5, wherein the selected offset values of high probability are determined as a function of pilot tone frequency.

7. The method of claim 6, wherein the selected offset values comprise offsets of 8*k samples, where k is a positive or negative integer.

8. The method of claim 7, wherein the selected offset values comprise offsets of −8, 0, and +8 samples.

9. The method of claim 4, further comprising the step of adjusting the sample clock by the determined offset value.

10. A method for estimating synchronization offset in a received telecommunications signal comprising the steps of:

receiving a plurality of channels of data in the time domain including components of a synchronization symbol, sampling the received plurality of channels of data at a sample clock rate to produce a synchronization symbol of unknown offset to a synchronization symbol pointer, transforming the synchronization symbol of unknown offset into the frequency domain to produce a synchronization symbol constellation, comparing the synchronization symbol constellation with at least one stored synchronization symbol template, each of the at least one stored synchronization symbol templates comprising a synchronization symbol of known offset transformed into the frequency domain, and determining offset of the synchronization symbol of unknown offset from the comparison of the synchronization symbol constellation with the at least one stored synchronization template, wherein the step of comparing the synchronization symbol constellation with at least one stored synchronization symbol template comprises the step of measuring distances from a plurality of points in a constellation of data points within the synchronization symbol constellation to a corresponding plurality of points in a constellation of data points within the at least one synchronization symbol template.

11. The method of claim 10, wherein the step of comparing the synchronization symbol constellation with at least one stored synchronization symbol template comprises the steps of successively measuring Euclidian distance values between the synchronization symbol constellation with a plurality of stored synchronization symbol templates, each of the plurality of stored synchronization symbol templates comprising a synchronization symbol of a known offset transformed into the frequency domain.

12. The method of claim 11, wherein the step of determining offset of the synchronization symbol of unknown offset comprises the step of selecting an offset value corresponding to a synchronization symbol template from the plurality of stored synchronization symbol templates having the least Euclidean distance value as a determined offset value.

13. The method of claim 12, wherein said plurality of stored synchronization symbol templates comprises a number of synchronization symbol templates corresponding to selected offset values including offsets of high probability.

14. The method of claim 13, wherein the selected offset values of high probability are determined as a function of pilot tone frequency.

15. The method of claim 14, wherein the selected offset values comprise offsets of 8*k samples, where k is a positive or negative integer.

16. The method of claim 15, wherein the selected offset values comprise offsets of −8, 0, and +8 samples.

17. The method of claim 12, further comprising the step of adjusting the sample clock by the determined offset value.

18. An apparatus for estimating time offset of a synchronization symbol in a received telecommunications signal comprising:

receiving means for receiving a plurality of channels of data in the time domain including components of the synchronization symbol;

a sample clock, coupled to the receiving means, for generating a sample clock signal having a sample clock rate;

a sampler, coupled to the receiving means, for sampling the received plurality of channels of data at the sample clock rate to produce a synchronization symbol of unknown offset to a synchronization symbol pointer;

transform means, coupled to the sampler, for transforming the synchronization symbol of unknown offset into the frequency domain to produce a synchronization symbol constellation;

storage means for storing a plurality of constellation templates, each of the plurality of stored constellation templates comprising a constellation of a synchronization symbol of known offset obtained by transforming the synchronization symbol of known offset into the frequency domain;

comparison means, coupled to the transform means and the storage means, for comparing the synchronization symbol constellation with the plurality of stored constellation templates; and determination means for determining offset of the synchronization symbol of unknown offset from the comparison of the synchronization symbol constellation with the plurality of stored constellation templates.

19. The apparatus of claim 18, wherein the comparison means comprises:

means for measuring a distance from a plurality of points in a constellation of data points within the synchronization symbol constellation and a corresponding plurality of points in a constellation of data points within the plurality of stored constellation templates.

20. The apparatus of claim 19, wherein the comparison means further comprises:

means for successively measuring distance values between the synchronization symbol constellation with the plurality of stored constellation templates.

21. The apparatus of claim 20, wherein said determining means comprises:

selecting means for selecting an offset value corresponding to a constellation template from the plurality of stored constellation templates having the least distance value as a determined offset value.

22. The apparatus of claim 21, wherein said storage means stores a number of constellation templates corresponding to selected offset values including offsets of high probability.

23. The apparatus of claim 22, wherein said storage means stores high probability offset values of the constellation templates, determined as a function of pilot tone frequency.

24. The apparatus of claim 23, wherein the selected offset values comprise offsets of 8*k samples, where k is a positive or negative integer.

25. The apparatus of claim 24, wherein the selected offset values comprise offsets of −8, 0, and +8 samples.

26. The apparatus of claim 21, further comprising:

means for adjusting the symbol boundary pointer by the determined offset value.

27. An apparatus for estimating synchronization offset in a received telecommunications signal comprising:

receiving means for receiving a plurality of channels of data in the time domain including components of a synchronization symbol;

a sample clock, coupled to the receiving means, for generating a sample clock signal having a sample clock rate;

a sampler, coupled to the receiving means, for sampling the received plurality of channels of data at the sample clock rate to produce a synchronization symbol of unknown offset to a synchronization symbol pointer;

transform means, coupled to the sampler, for transforming the synchronization symbol of unknown offset into the frequency domain to produce a synchronization symbol constellation;

storage means for storing at least one synchronization symbol template, each of the at least one stored synchronization symbol templates comprising a synchronization symbol of known offset transformed into the frequency domain;

comparison means, coupled to the transform means and the storage means, for comparing the synchronization symbol constellation with the at least one stored synchronization symbol template; and determination means for determining offset of the synchronization symbol of unknown offset from the comparison of the synchronization symbol constellation with the at least one stored synchronization template, wherein the comparison means comprises:

means for measuring a distance from a plurality of points in a constellation of data points within the synchronization symbol constellation and a corresponding plurality of points in a constellation of data points within the at least one synchronization symbol template.

28. The apparatus of claim 27, wherein the comparison means further comprises:

means for successively measuring Euclidian distance values between the synchronization symbol constellation with a plurality of stored synchronization symbol templates.

29. The apparatus of claim 28, wherein said determining means comprises:

selecting means for selecting an offset value corresponding to a synchronization symbol template from the plurality of stored synchronization symbol templates having the least Euclidean distance value as a determined offset value.

30. The apparatus of claim 29, wherein said storage means stores a number of synchronization symbol templates corresponding to selected offset values including offsets of high probability.

31. The apparatus of claim 30, wherein said storage means stores high probability offset values of the synchronization symbol templates, determined as a function of pilot tone frequency.

32. The apparatus of claim 13, wherein the selected offset values comprise offsets of 8*k samples, where k is a positive or negative integer.

33. The apparatus of claim 32, wherein the selected offset values comprise offsets of −8, 0, and +8 samples.

34. The apparatus of claim 29, further comprising:

means for adjusting the sample clock by the determined offset value.

35. A method for estimating time offset of a synchronization symbol in a received telecommunications signal comprising the steps of:

receiving a plurality of channels of data in the time domain including components of the synchronization symbol, sampling the received plurality of channels of data at a sample clock rate to produce a synchronization symbol of unknown offset to a synchronization symbol pointer, transforming the synchronization symbol of unknown offset into the frequency domain to produce a synchronization symbol constellation, comparing the synchronization symbol constellation with a plurality of stored constellation templates, each of the plurality of stored constellation templates obtained by transforming into frequency domain a time domain version of synchronization symbol shifted by a predetermined number of samples, and determining offset of the synchronization symbol of unknown offset from the comparison of the synchronization symbol constellation with the plurality of stored constellation templates, wherein the step of comparing the synchronization symbol constellation with a plurality of stored constellation templates comprises the step of measuring distances from a plurality of points in a constellation of data points within the synchronization symbol constellation to a corresponding plurality of points in a constellation of data points within the plurality of stored constellation templates.

36. The method of claim 35, wherein the step of comparing the synchronization symbol constellation with a plurality of stored constellation templates comprises the steps of successively measuring distance values between the synchronization symbol constellation with the plurality of stored constellation templates.

37. The method of claim 36, wherein the step of determining offset of the synchronization symbol of unknown offset comprises the step of selecting an offset value corresponding to a constellation template from the plurality of stored constellation templates having the least distance value as a determined offset value.

38. The method of claim 37, wherein said plurality of stored constellation templates comprises a number of constellation templates corresponding to selected offset values including offsets of high probability.

39. The method of claim 38, wherein the selected offset values of high probability are determined as a function of pilot tone frequency.

40. The method of claim 39, wherein the selected offset values comprise offsets of 8*k samples, where k is a positive or negative integer.

41. The method of claim 40, wherein the selected offset values comprise offsets of −8, 0, and +8 samples.

42. The method of claim 37, further comprising the step of adjusting the sample clock by the determined offset value.

43. An apparatus for estimating time offset of a synchronization symbol in a received telecommunications signal comprising:

receiving means for receiving a plurality of channels of data in the time domain including components of the synchronization symbol;

a sample clock, coupled to the receiving means, for generating a sample clock signal having a sample clock rate;

a sampler, coupled to the receiving means, for sampling the received plurality of channels of data at the sample clock rate to produce a synchronization symbol of unknown offset to a synchronization symbol pointer;

transform means, coupled to the sampler, for transforming the synchronization symbol of unknown offset into the frequency domain to produce a synchronization symbol constellation;

storage means for storing a plurality of constellation templates, each of the plurality of stored constellation templates comprising a constellation of a synchronization symbol of known offset obtained by transforming the synchronization symbol of known offset into the frequency domain;

comparison means, coupled to the transform means and the storage means, for comparing the synchronization symbol constellation with the plurality of stored constellation templates; and determination means for determining an offset of the synchronization symbol of unknown offset from the comparison of the synchronization symbol constellation with the plurality of stored constellation templates.

wherein the comparison means comprises:
  means for measuring a distance from a plurality of points in a constellation of data points within the synchronization symbol constellation and a corresponding plurality of points in a constellation of data points within the plurality of stored constellation templates.

44. The apparatus of claim 43, wherein the comparison means further comprises:
  means for successively measuring distance values between the synchronization symbol constellation with the plurality of stored constellation templates.

45. The apparatus of claim 44, wherein said determining means comprises:
  selecting means for selecting an offset value corresponding to a constellation template from the plurality of stored constellation templates having the least distance value.

46. The apparatus of claim 45, wherein said storage means stores a number of constellation templates corresponding to selected offset values including offsets of high probability.

47. The apparatus of claim 46, wherein said storage means stores high probability offset values of the constellation templates, determined as a function of pilot tone frequency.

48. The apparatus of claim 47, wherein the selected offset values comprise offsets of 8*k samples, where k is a positive or negative integer.

49. The apparatus of claim 48, wherein the selected offset values comprise offsets of −8, 0, and +8 samples.

50. The apparatus of claim 45, further comprising:
  means for adjusting the symbol boundary pointer by a selected determined offset value.

* * * * *